No. 870,803. PATENTED NOV. 12, 1907.
C. B. THWING.
ELECTRICAL MEASURING INSTRUMENT.
APPLICATION FILED JAN. 25, 1907.
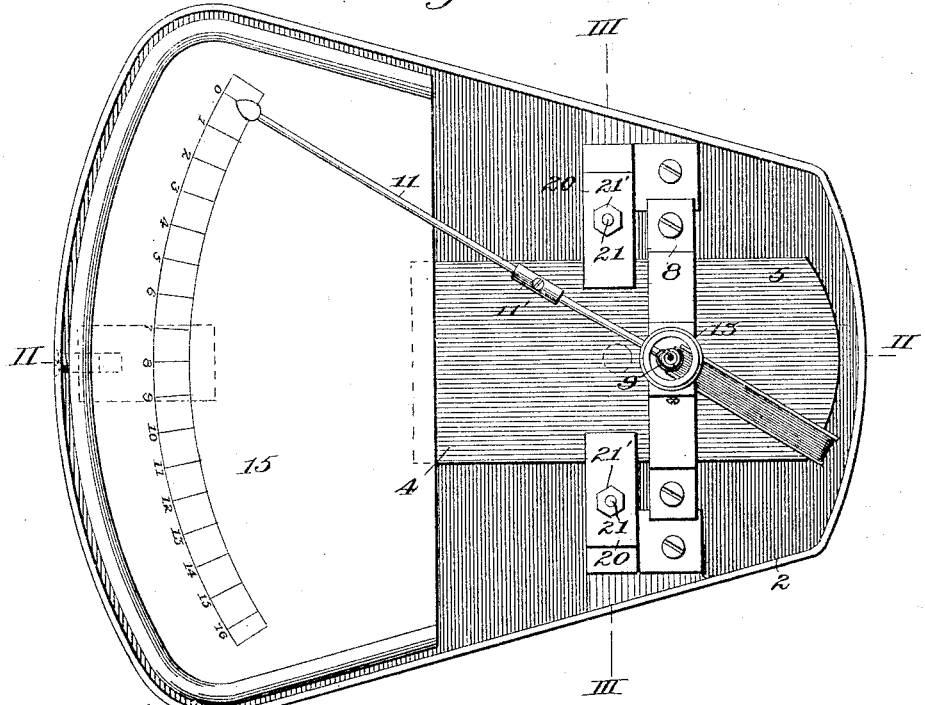
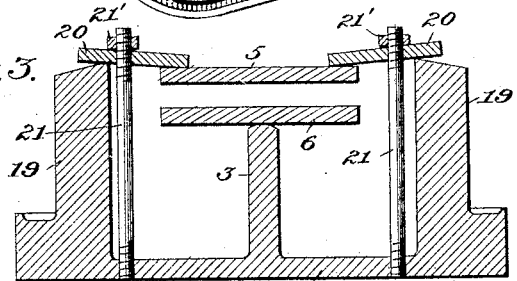
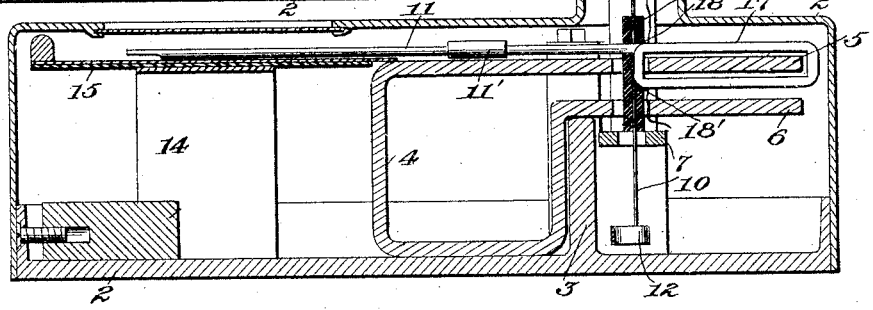
Witnesses: Inventor:
Charles B. Thwing,
by W. B. Corwin
Att'y

UNITED STATES PATENT OFFICE.

CHARLES B. THWING, OF PHILADELPHIA, PENNSYLVANIA.

ELECTRICAL MEASURING INSTRUMENT.

No. 870,803. Specification of Letters Patent. Patented Nov. 12, 1907.

Application filed January 25, 1907. Serial No. 354,033.

*To all whom it may concern:*

Be it known that I, CHARLES B. THWING, a citizen of the United States, residing at Philadelphia, Philadelphia county, Pennsylvania, have invented a new and useful Improvement in Electrical Measuring Instruments, of which the following is a specification.

My invention relates to that class of electrical measuring instruments in which a coil vibrating in a field of magnetic force, is caused, by the passage of a current through it, to move a distance depending upon the amount of the current; and it has for its object, among others, to provide means for automatically varying the reluctance to compensate for variations in the resistance of the electric circuit due to changes of temperature in the surrounding atmosphere.

Another object of my invention is to improve and simplify the general construction of such instruments.

I shall now describe my invention, reference being had to the accompanying drawing, forming part of this specification, in which Figure 1 is a top plan view of my improved instrument, with the casing removed. Fig. 2 is a longitudinal vertical section on the line II—II of Fig. 1, showing the casing in place. Fig. 3 is a transverse vertical section on the line III—III of Fig. 1.

Like symbols of reference indicate like parts in each of the figures.

In the drawing, 2 represents the base or support for the various parts of the instrument, said base or support being formed of aluminium or other suitable material. Resting at its rear or body portion upon the base 2 and having its under leg supported by the pillar 3, is a magnet 4. This magnet is constructed of a strip of sheet spring metal, and is of peculiar and novel form, as shown, having a body 4 of rectangular or other desired form, with two flat legs or poles, 5, 6, extending in close and substantially parallel relation therefrom. Mounted upon a cross-bar 7, extending transversely of the instrument, is the support 8 for the upper spring bearing 9, from which the wire 10 for supporting the coil and the attached pointer 11 of the instrument is hung.

11′ is an adjustable counterbalance on the pointer, the purpose of which needs no explanation.

12 represents a bearing, similar to the bearing 9, to which the lower end of the wire 10 is attached. It will be understood that the coil and the attached pointer may be suspended in other ways than by the wire 10.

13 is a casing for protecting the bearing 9, should it be desired at any time to remove the casing 2′ for adjustment or repairs of any of the parts.

14 is the support for the calibrated scale 15.

17 is the movable coil of the galvanometer, mounted at or near its inner end in a shouldered recess 18′ of a sleeve 18, to which sleeve the pointer 11 and suspension wire 10 are also connected. Said coil is adapted to vibrate (with one side in the air gap between the poles 5 and 6 of the magnet) about an axis passing approximately through one of its ends.

Extending upwardly from the base 2 and preferably formed integral therewith, are two pillars or columns 19 of aluminium or other suitable expansible and contractible material. 20 are two clips resting at their outer ends upon the pillars 19 and at their inner ends upon the top surface of the leg 5 of the magnet. The clips 20 are held in position by the nuts 21′ on the rods 21, said rods passing through the clips at their upper ends and at their lower ends being screwed into or otherwise fastened to the base 2. The rods 21 are formed of nickel steel or other material substantially inexpansible and non-contractible under a considerable range of temperature.

As is well known, the resistance of copper and other metals ordinarily employed to form the circuits and coils of galvanometers increases upon increase of temperature of the same. Such increase of resistance, if not compensated for, will affect the working of a galvanometer and render it faulty and its scale indications inaccurate. I compensate for such increase in resistance in the electric circuit in the following manner:—The galvanometer having first been adjusted to operate and register correctly at a certain temperature, any increase of temperature of the atmosphere in which the instrument may subsequently be used, above that in which it was so adjusted, will cause the pillars or columns 19 of aluminium to expand upwardly and push the outer ends of the clips 20 upwardly. A downward movement of the inner ends of the clips will naturally follow, inasmuch as the length of the rods 21, which are made of a substantially inexpansible material, remains constant. As the inner ends of the clips impinge against the pole 5 of the magnet, and as the magnet is constructed of spring metal, the downward movement of the clips will produce a downward movement of the pole 5 and a closer approach of such pole to the lower pole 6. At the same time, the support 3 for the lower pole 6 being also formed of aluminium will expand and force the pole 6 towards the pole 5. Such approach of the poles of the magnet causes a decrease in the reluctance of the magnetic circuit and a consequent increase in force of the magnetic field corresponding to the extent of movement of the poles towards each other, and thus the reluctance will be varied to compensate for variations in the resistance of the electric circuit due to changes in temperature of the atmosphere surrounding the same, and the instrument will therefore give accurate readings irrespective of the temperature of the atmosphere in which it may be located.

The manner of connecting the wires of the electric circuit to the galvanometer and to the coil forms no part of my invention, and consequently I have not shown the same as it would add nothing which would aid in an understanding of the invention and might lead to confusion.

The advantages of my invention will be appreciated by those skilled in the art. A galvanometer made in accordance therewith is simple and compact in construction, cheap as to manufacture, and accurate in results.

Modifications may be made in the form, construction, and arrangement of the various parts, and other metals or materials having the necessary qualities may be substituted for those described without departing from the spirit of the invention or sacrificing any of its advantages.

I claim:—

1. In an electrical measuring instrument, a permanent magnet, an armature movable in the field of said magnet, and means responding to changes in temperature for automatically varying the reluctance of the magnetic circuit to compensate for variations in the resistance of the electric circuit of the armature due to changes of temperature in the atmosphere surrounding the galvanometer.

2. In a movable coil galvanometer, a permanent magnet, and a coil movable in the magnetic field of said magnet, and means responding to changes of temperature for automatically varying the reluctance of the magnetic circuit to compensate for variations in the resistance of the electric circuit of said coil due to changes of temperature in the atmosphere surrounding the galvanometer.

3. In an electrical measuring instrument, a magnet having poles adapted to be moved towards or from each other, a coil movable in the magnetic field between said poles, and means for automatically varying the distance between said poles in order to vary the strength of the magnetic field to compensate for variations in the resistance of the electric circuit due to changes of temperature in the atmosphere surrounding the instrument.

4. In an electrical measuring instrument, a one-piece magnet having spring terminals or poles adapted to be moved towards or from each other, a coil movable in the magnetic field between said terminals or poles, and means for automatically varying the distance between said poles in order to vary the strength of the magnetic field to compensate for variations in the resistance of the electric circuit due to changes of temperature in the atmosphere surrounding the instrument.

In testimony whereof I have hereunto set my hand.

CHARLES B. THWING.

Witnesses:
 A. B. AMES,
 B. K. MORTON.